United States Patent
Wang et al.

(10) Patent No.: US 10,194,180 B2
(45) Date of Patent: Jan. 29, 2019

(54) SYSTEMS AND METHODS FOR TRANSMITTING VIDEO DATA OVER A NETWORK

(71) Applicant: SHANGHAI XIAOYI TECHNOLOGY CO., LTD., Shanghai (CN)

(72) Inventors: Baoqi Wang, Shanghai (CN); Changjiang Wei, Shanghai (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 15/176,059

(22) Filed: Jun. 7, 2016

(65) Prior Publication Data
US 2017/0347133 A1 Nov. 30, 2017

(30) Foreign Application Priority Data
May 30, 2016 (CN) .......................... 2016 1 0371086

(51) Int. Cl.
*H04N 7/173* (2011.01)
*H04N 21/2381* (2011.01)
(Continued)

(52) U.S. Cl.
CPC ..... *H04N 21/2381* (2013.01); *H04N 5/23206* (2013.01); *H04N 21/234* (2013.01);
(Continued)

(58) Field of Classification Search
CPC ........................... H04N 21/647; H04N 21/658
See application file for complete search history.

(56) References Cited

U.S. PATENT DOCUMENTS

2008/0013613 A1* 1/2008 Ahmad ............... H04L 41/5003 375/224
2008/0104211 A1* 5/2008 Blumenfeld ...... G06F 17/30893 709/221

(Continued)

FOREIGN PATENT DOCUMENTS

CN 102254140 A 11/2011
CN 104768153 A 7/2015

OTHER PUBLICATIONS

Chinese Office Action issued by the State Intellectual Property Office of the People's Republic of China in counterpart Chinese Patent Application No. 201510371086.8 dated Sep. 7, 2018.

*Primary Examiner* — Gigi L Dubasky
(74) *Attorney, Agent, or Firm* — Finnegan, Henderson, Farabow, Garrett & Dunner (57) ABSTRACT

Systems and methods for transmitting video data over a network are provided. The system comprises a camera configured to capture video data, and a hardware processor configured to receive a connection signal to establish a direct connection with a network connectivity provider. After receiving the connection signal, the hardware processor can establish a network socket with a target server via the network connectivity provider, receive network connectivity status information, and determine first parameters for capturing of video data and second parameters for generation of data packets representing the captured video data based on the network connectivity status information. The hardware processor can control, based on the first parameters, the camera to capture video data; generate, based on the second parameters, data packets representing the captured video data; and transmit the data packets to the target server using the network socket.

20 Claims, 6 Drawing Sheets

(51) Int. Cl.
  *H04W 76/12* (2018.01)
  *H04N 5/232* (2006.01)
  *H04N 21/234* (2011.01)
  *H04N 21/4223* (2011.01)
  *H04N 21/63* (2011.01)
  *H04N 21/643* (2011.01)
  *H04W 12/06* (2009.01)
  *H04N 21/2743* (2011.01)
  *H04N 21/436* (2011.01)
  *H04N 21/6547* (2011.01)
  *H04W 4/70* (2018.01)

(52) U.S. Cl.
  CPC ..... *H04N 21/2743* (2013.01); *H04N 21/4223* (2013.01); *H04N 21/436* (2013.01); *H04N 21/632* (2013.01); *H04N 21/64322* (2013.01); *H04N 21/6547* (2013.01); *H04W 4/70* (2018.02); *H04W 12/06* (2013.01); *H04W 76/12* (2018.02)

(56) References Cited

U.S. PATENT DOCUMENTS

| | | | |
|---|---|---|---|
| 2012/0030735 A1* | 2/2012 | Sato | H04L 63/0884 726/5 |
| 2014/0181518 A1* | 6/2014 | Kim | G06F 21/6281 713/168 |
| 2014/0333716 A1* | 11/2014 | Kitazawa | H04N 7/15 348/14.13 |

\* cited by examiner

SYSTEMS AND METHODS FOR TRANSMITTING VIDEO DATA OVER A NETWORK

RELATED APPLICATION

This application is based upon and claims priority from Chinese Patent Application No. 201610371086.8, filed on May 30, 2016, which is incorporated herein by reference in its entirety.

TECHNICAL FIELD

This disclosure generally relates to network technology, and more specifically relates to systems and methods for transmitting video data over a network.

BACKGROUND

With the advent of network and mobile technologies, Internet video broadcasting has become an important part of everyday life, as people increasingly receive video content through the Internet and consume media content at their mobile devices. The rapid growth of Internet video broadcasting also fuels the demand for real-time video capturing and transmission over the Internet, which involves capturing and coding of video images into digital data, packetizing the digital data, and transmitting the video data packets over the Internet.

With current technologies, real-time video capturing and transmission includes connecting a camera to a processing device (e.g., a computer) with Internet connectivity. The computer, upon receiving the coded video image digital data, can packetize the digital data into data packets, and then transmit the data packets over the Internet to other devices. The setup of the equipment for real-time video capturing and transmission can be tedious and time-consuming. Moreover, the camera typically does not adjust the size of video image digital data (e.g., by adjusting the resolution of image capturing) according to a status of the network traffic. If the camera transmits a huge volume of data when the network is already congested, the data packets can either experience a huge latency in transmission over the network, or can be dropped and not transmitted over the network at all. As a result, the user experience can be substantially degraded. Methods and apparatus are provided for addressing one or more of these issues.

SUMMARY

Consistent with embodiments of this disclosure, there is provided a system for transmitting video data over a network. The system comprises a camera configured to capture video data, a memory storing a set of instructions, and a hardware processor configured to execute the set of instructions to receive a connection signal to establish a direct connection with a network connectivity provider. After receiving the connection signal, the hardware processor can establish a network socket with a target server via the network connectivity provider, receive network connectivity status information, and determine first parameters for capturing of video data and second parameters for generation of data packets representing the captured video data, wherein at least one of the first and second parameters are determined based on the network connectivity status information. The hardware processor can control, based on the first parameters, the camera to capture video data; generate, based on the second parameters, data packets representing the captured video data; and transmit the data packets to the target server using the network socket.

Consistent with embodiments of this disclosure, there is also provided a system for transmitting video data over a network. The system comprises a camera configured to capture video data, a memory storing a set of instructions, and a hardware processor configured to execute the set of instructions to receive a connection signal to establish an indirect connection with a network connectivity provider. After receiving the connection signal, the hardware processor can establish a peer-to-peer connection with a second device, and provide an IP address to the second device to establish a network socket with a target server. After the network socket is established, the hardware processor can generate data packets representing the captured video data, and transmit the data packets to the second device to enable the second device to transmit the data packets to the target server.

Consistent with embodiments of this disclosure, a method for transmitting video data over a network is provided. The method is performed by a hardware processor and comprises: receiving a connection signal to establish a direct connection with a network connectivity provider; after receiving the connection signal: establishing a network socket with a target server via the network connectivity provider, receiving network connectivity status information, determining first parameters for capturing of video data and second parameters for generation of data packets representing the captured video data, wherein at least one of the first and second parameters are determined based on the network connectivity status information, controlling, based on the first parameters, the camera to capture video data, generating, based on the second parameters, data packets representing the captured video data, and transmitting the data packets to the target server using the network socket.

Consistent with embodiments of this disclosure, a method for transmitting video data over a network is further provided. The method is performed by a hardware processor and comprises: receiving a connection signal to establish an indirect connection with a network connectivity provider; after receiving the connection signal: providing an IP address to the second device to establish a network socket with a target server, and after the network socket is established: generating data packets representing the captured video data, and transmitting the data packets to the second device to enable the second device to transmit the data packets to the target server.

Consistent with other disclosed embodiments, a non-transitory computer readable medium is further provided. The non-transitory computer readable medium stores a set of instructions that is executable by a hardware processor to cause the hardware processor to perform any of the methods described herein.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. The same reference numbers are used throughout the drawings to refer to the same or like parts.

These and other objects, features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be understood, however, that the drawing(s) are for the purpose of illustration and description only and are not intended as a definition of the limits of the invention. As used in the specification and in the claims, the singular form of "a", "an", and "the" include plural referents unless the context clearly dictates otherwise.

Embodiments of the present disclosure provide a system for transmitting video data over a network. The system comprises a camera configured to capture video data, a memory storing a set of instructions, and a hardware processor configured to execute the set of instructions to receive a connection signal to establish a direct connection with a network connectivity provider. After receiving the connection signal, the hardware processor can establish a network socket with a target server via the network connectivity provider, receive network connectivity status information, and determine first parameters for capturing of video data and second parameters for generation of data packets representing the captured video data, wherein at least one of the first and second parameters are determined based on the network connectivity status information. The hardware processor can control, based on the first parameters, the camera to capture video data; generate, based on the second parameters, data packets representing the captured video data; and transmit the data packets to the target server using the network socket.

Embodiments of the present disclosure also provide a system for transmitting video data over a network. The system comprises a camera configured to capture video data, a memory storing a set of instructions, and a hardware processor configured to execute the set of instructions to receive a connection signal to establish an indirect connection with a network connectivity provider. After receiving the connection signal, the hardware processor can establish a peer-to-peer connection with a second device, and provide an IP address to the second device to establish a network socket with a target server. After the network socket is established, the hardware processor can generate data packets representing the captured video data, and transmit the data packets to the second device to enable the second device to transmit the data packets to the target server.

With embodiments of the present disclosure, a camera can be connected to the network either directly via a Wi-Fi router or indirectly via a mobile device (e.g., a smart phone, a tablet, etc.). The connection can be invoked automatically either the camera or by the mobile device after receiving an input from the user. Therefore, the setup is simple and efficient compared with current technologies. Moreover, the camera can also adjust the generation of data packets based on a status of network connectivity. Therefore, network congestion due to excessive data traffic generated by the camera, and the resulting latency and loss of packets, can be avoided. As a result, user experience can be improved.

Figure 1:
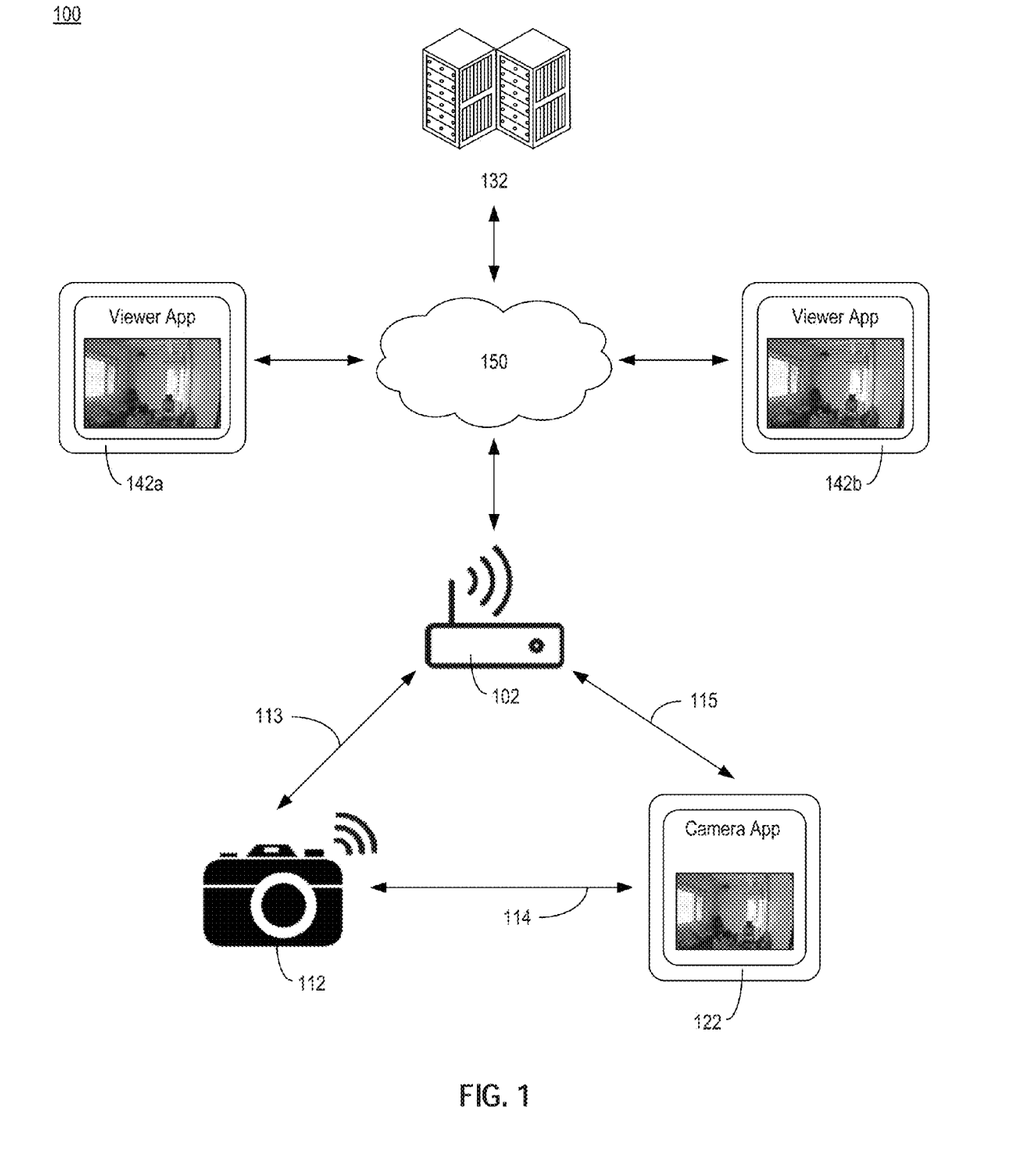
FIG. 1 is an exemplary system for generating and transmitting video data over a network, consistent with disclosed embodiments.

FIG. 1 is a block diagram illustrating an exemplary system 100 for transmitting video data over a network, consistent with disclosed embodiments. As shown in FIG. 1, system 100 includes a network connectivity provider 102, a camera 112, a mobile device 122, and a server group 132. System 100 further includes mobile devices 142 and 144. At least one of camera 112 and mobile device 122 can transmit data to server group 132 over network 150 via network connectivity provider 102. Server group 132 can then provide the data, over network 150, to mobile devices 142 and 144.

Network connectivity provider 102 can include a device that enables at least one camera 112 and/or mobile device 122 to connect to network 150. In some embodiments, network connectivity provider 102 includes a wireless router configured as a Wi-Fi hotspot, which can establish a Wi-Fi connection with camera 112 and/or mobile device 122. In some embodiments, network connectivity provider 102 includes a base station of a cellular network, and which enables mobile device 122 to connect to network 150 via the cellular network. In such a case, mobile device 122 can provide a connection between camera 112 and network connectivity provider 102, which enables camera 112 to connect to network 150.

In some embodiments, camera 112 may include a processor configured to execute software instructions for performing operations consistent with the disclosed embodiments, and an image capturing system configured to capture video images and to facilitate the generation of digital data representing the video images. Camera 112 also includes a communication interface configured to transmit and receive data from a network. For example, camera 112 can transmit the digital data to server group 132 and establish connections with other devices to acquire configuration information for transmission of the digital data to a target server. For example, as shown in FIG. 1, camera 112 can form a connection 113 with network connectivity provider 102, and/or a connection 115 with mobile device 122. Camera 112 can also form a connection 114 with mobile device 122.

Mobile device 122 may include a processor configured to execute software instructions (e.g., a camera app) for performing operations consistent with the disclosed embodiments. In some embodiments, mobile device may be a tablet, smartphone, a laptop, etc., and may include a communication interface configured to communicate with camera 112 and network connectivity provider 102.

In a case where network connectivity provider 102 includes a wireless router configured as a Wi-Fi hotspot, connection 113 between camera 112 and network connectivity provider 102 can include a Wi-Fi access point (AP) connection. Prior to establishing the Wi-Fi connection, camera 112 can obtain configuration information including, for example, a Service Set Identifier (SSID) associated with the wireless network provided by the wireless router, a password associated with accessing the wireless network via the wireless router, an identifier associated with server group 132 (e.g., an uniform resource locator (URL)), which enables camera 112 to obtain other identification information of server group 132, such as an IP address and a port number associated with server group 132.

There are various ways by which camera 112 can obtain the configuration information. For example, camera 112 may receive the configuration information from mobile device 122 via connection 114, which can be configured to provide a peer-to-peer connection associated with various protocols, such as Wi-Fi Direct, Bluetooth®, etc. As an illustrative example, mobile device 122 can receive the configuration information from another source (e.g., input by a user via the camera app), establish connection 114 with camera 112, and then transmit the configuration information to camera 112 via connection 114. The transmission of the configuration information can also cause camera 112 to establish a Wi-Fi connection with network connectivity provider 102 using the SSID and password information included in the configuration information. In some embodiments, after camera 112 establishes the Wi-Fi connection (or after camera 112 establishes a network socket with server group 132, as to be described below), camera 112 may transmit an indication of Wi-Fi connection back to mobile device 122, which may then terminate connection 114. Such an arrangement can reduce power consumption by camera 112 and prevent interference with communication between camera 112 and network connectivity provider 102.

As another example, camera 112 may receive the configuration information in the form of an image. For example, the configuration information can be represented in the form of two-dimensional bar codes. Camera 112 can capture an image of the two-dimensional bar codes that represent the configuration information, and derive the configuration information from the image data. The two-dimensional bar codes image can be provided by mobile device 122 (e.g., the image being displayed on a display screen of mobile device 122), or can be provided by other devices/sources. In some embodiments, after capturing an image of two-dimensional bar codes and determining that the two-dimensional bar codes include configuration information for establishing Wi-Fi connection (e.g., by determining that the two-dimensional bar codes include a set of numbers in SSID format), camera 112 can also be prompted to establish connection with network connectivity provider 102 using the SSID and password information included in the configuration information.

After establishing the Wi-Fi connection with network connectivity provider 102 using the configuration information, camera 112 can then request access to network 150 via network connectivity provider 102. There are various ways of requesting access. As an illustrative example, network connectivity provider 102 can be configured to act as a Dynamic Host Configuration Protocol (DHCP) server, while camera 112 can also be configured to act as a DHCP client. In this case, camera 112 can transmit a request to network connectivity provider 102 for an allocation of an Internet Protocol (IP) address. After being allocated an IP address, camera 112 can then access the network 150.

In some embodiments, mobile device 122 can also request allocation of an IP address from network connectivity provider 102, which acts as a DHCP server, and provide the allocated IP address as part of the configuration information to camera 112 (either through connection 114 and/or by displaying an image that include the configuration information). In such a case, mobile device 122 can then establish a network socket with server group 132 using the IP address provided by mobile device 122.

As another illustrative example, network connectivity provider 102 can also grant access to camera 112 based on an identifier associated with the camera, such as a media access control (MAC) address. In this case, network connectivity provider 102 may maintain a list of devices (and their associated MAC addresses) that is allowed to access external network via network connectivity provider 102. After determining that camera 112 is on the list, network connectivity provider 102 can grant access to camera 112.

In some embodiments the configuration information can be pre-stored at camera 112 so that camera 112 needs not obtain the configuration information from mobile device 122 again (or from other sources), and can automatically connect with network connectivity provider 102 after being turned on.

With the allocated IP address (or with its own MAC address), as well as the IP address and port number information associated with server group 132, camera 112 can establish a network socket with server group 132. The network socket can include, for example, a stream socket under the Transmission Control Protocol (TCP). Camera 112 can then generate data packets that represent the captured video data, and transmit data packets using the network socket to server group 132.

In some embodiments, after establishing the network socket with server group 132, camera 112 can also acquire information related to a status of connectivity between camera 112 and server group 132. The status of connectivity information can include, for example, a latency of transmission of data packets between camera 112 and server group 132, a percentage of data packets lost in the transmission, inter packet delay, a jitter value, etc. In some embodiments, camera 112 can receive a message including information about a status of connectivity from an application operating on server group 132, and/or from a network service provider.

Based on the status of connectivity information, camera 112 can adjust one or more parameters for capturing of the image/video data and/or generation of data packets. For example, camera 112 can determine, based on the status of connectivity information, a threshold for a size of data to be transmitted to server group 132 within a timing window. If at a given time camera 112 determines that the size of data packets to be transmitted exceeds the threshold, camera 112 may adjust one or more image capture parameters. The image capture parameters can include, for example, image resolution (e.g., 1080 p, 720 p, 480 p, 360 p, 240 p, etc.), frame rate, etc., all of which can affect the rate at which camera 112 generates and transmits the data packets to server group 132.

Moreover, camera 112 may also determine one or more parameters for transcoding and compressing the captured data. For example, if camera 112 determines that the size of data packets to be transmitted exceeds the threshold, camera 112 may determine to transcode the data using a codec that achieves higher rate of compression (e.g., such that the data include less I-frames and more P and B frames, representing the data in interlaced format, etc.), and generate the data packets accordingly.

In some embodiments, camera 112 can also establish an indirect connection with network connectivity provider 102 via mobile device 122. As an illustrative example, in a case where network connectivity provider 102 includes a base station of a cellular network and that network connectivity provider 102 lacks capability to connect to a cellular network, while mobile device is capable of connecting to the cellular network, camera 112 may be configured to establish a connection with network connectivity provider 102 via mobile device 122. The configuration can be initiated by user input at an input interface of the camera. As another illustrative example, in a case where network connectivity provider 102 includes a Wi-Fi router but camera 112 is not capable of forming a Wi-Fi connection with network connectivity provider 102 for any reason, camera 112 may establish a connection with network connectivity provider 102 via mobile device 122.

As discussed before, connection 114 can be formed between camera 112 and mobile device 122, and such a connection can provide a peer-to-peer connection associated with various protocols, such as Wi-Fi Direct, Bluetooth®, etc. Camera 112 can also establish a connection with network connectivity provider 102 indirectly via mobile device 122 using connection 114.

For example, camera 112 can receive a connection signal to start a Wi-Fi Direct connection. The signal can come in various forms. For example, the signal may be in the form of user input received through an input interface. The signal can also be in the form of an instruction transmitted from another device. Moreover, camera 112 may also determine that it cannot establish a direct connection with network connectivity provider 102 (e.g., camera 112 is outside a coverage area of network connectivity provider 102), and therefore determine to start a Wi-Fi Direction connection with a nearby device.

After determining to start a Wi-Fi Direct connection, camera 112 can scan for another device that is capable of forming a Wi-Fi Direct connection. The scanning can include, for example, transmitting a Probe Request. After discovering a device (e.g., mobile device 122), camera 112 may establish connection 114 with mobile device 122 as a Wi-Fi Direct connection.

Camera 112 may also be configured as a Group Owner (GO) device under the Wi-Fi Direct protocol, and to act as a DHCP server to allocate an IP address. Alternatively, camera 112 can also provide its own MAC address. Camera 112 can then provide an IP address (allocated from DHCP server, or its own MAC address) to mobile device 122. Mobile device 122 can then establish connection 115 with network connectivity provider 102 (which can include a base station or a Wi-Fi router), and may provide the IP address to network connectivity provider 102 to gain access to network 150 via network connectivity provider 102.

In a case where network connectivity provider 102 is a Wi-Fi router, connection 115 can be configured as a Wi-Fi STA connection. Mobile device 122 can also receive the URL (or the IP address and port number) of server group 132 from, for example, a user input, and provide the URL to camera 112.

After being granted access to network 150, mobile device 122 can then use the IP address and the URL of server group 132 to establish a network socket (e.g., a TCP socket) with server group 132. Camera 112 can then transmit data packets to mobile device 122, which can then forward the data packets to server group 132.

Camera 112 may also receive network connectivity status information (e.g., a latency of transmission of data packets between camera 112 and server group 132, a percentage of data packets lost in the transmission, inter packet delay, a jitter value, etc.), and configure generation and transmission of data packets based on the network connectivity status information. Camera 112 may also instruct, based on the network connectivity status information, mobile device 122 to control a size of data packets to be transmitted to network connectivity provider 102.

Server group 132 can include one or more servers, a proxy server, etc., configured to receive video data from camera 112 and provide the video data to viewer devices (e.g., mobile devices 142a and 142b) over network 150. For example, server group 132 can include a first server which is associated with the URL in the configuration information and which is configured to receive the data packets from camera 112. Server group 132 can also include a second server for providing access to the video data. For example, the second server can be an application server that collects the data packets and reconstructing a video data file based on the data packets, and may transcode the video data file using a different codec to facilitate delivery of the content to other devices. The transcoded video data file can be associated with a second URL, and the transcoded video data file can be accessed using the second URL. Further, server group 132 may also operate one or more applications that provide connectivity status data to camera 112, which enables camera 112 to adjust the generation of image/video data packets based on the connectivity status.

Mobile devices 142a and 142b may include processors that are configured to execute software instructions (e.g., a viewer app) for performing operations consistent with the disclosed embodiments. In some embodiments, mobile device may be a tablet, smartphone, a laptop, etc., and includes a communication interface configured to communicate with server group 132. The viewer app may acquire the video data (generated by camera 112) from server group 132 by transmitting a request that includes the second URL. In some embodiments, mobile devices 142a and 142b can obtain the second URL from mobile device 122 via, for example, instant messaging, Webo, etc.

Network 150 may be any type of network configured to provide communications between components of system 100. For example, network 150 may be any type of network (including infrastructure) that provides communications, exchanges information, and/or facilitates the exchange of information, such as the Internet, a Local Area Network, a cellular network (e.g., LTE, 4G, 5G, etc.), Wi-Fi, Bluetooth®, or other suitable network that enables the sending and receiving of information between the components of system 100.

With embodiments of the present disclosure, a camera can be connected to the network either directly via a Wi-Fi router or indirectly via a mobile device (e.g., a smart phone, a tablet, etc.). The connection can be invoked automatically either the camera or by the mobile device after receiving an input from the user. Therefore, the setup is simple and efficient compared with current technologies. Moreover, the camera can also adjust the generation of data packets based on a status of network connectivity, therefore network congestion due to excessive data traffic generated by the camera, and the resulting latency and loss of packets, can be avoided. As a result, user experience can be improved.

Figure 2:
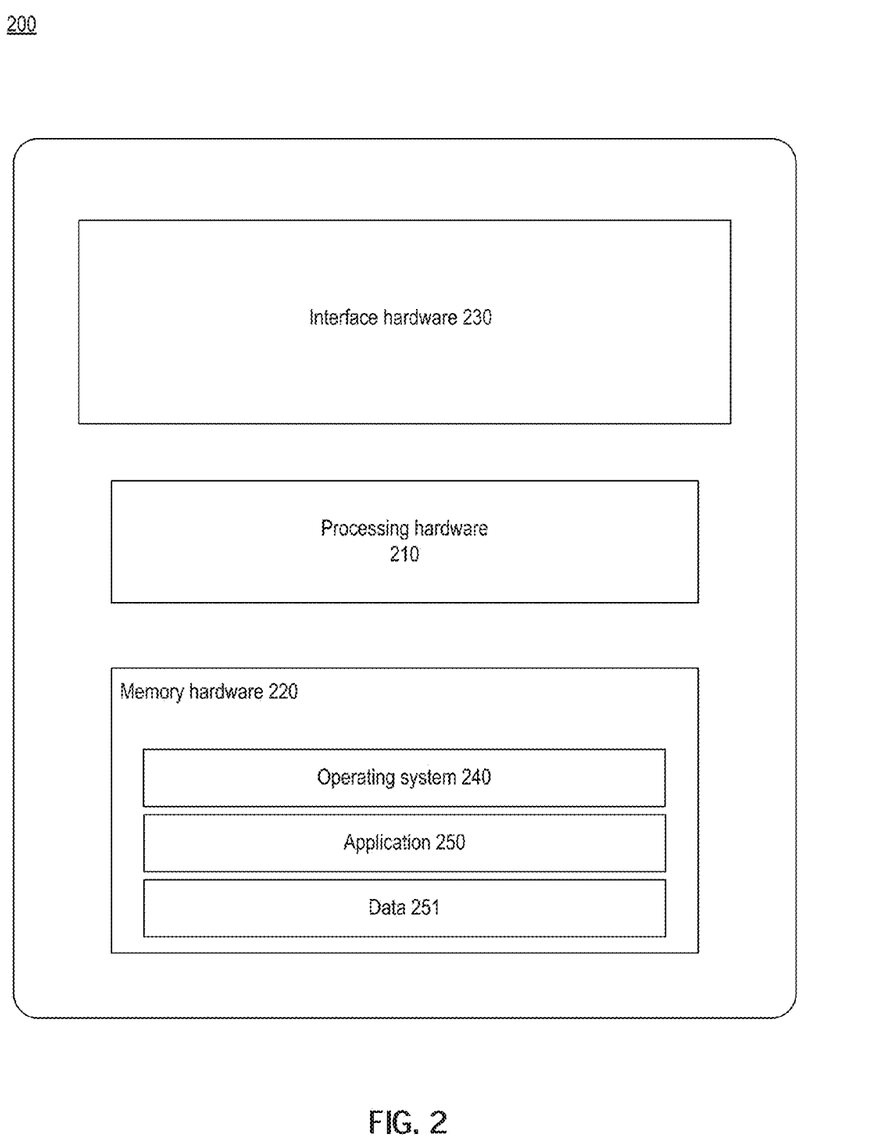
FIG. 2 is a block diagram of an exemplary system for generating and transmitting video data over a network, consistent with disclosed embodiments.

FIG. 2 depicts an exemplary system 200, which can be configured as camera 122 and/or mobile device 122, 142a, and 142b of FIG. 1. System 200 may include processing hardware 210, memory hardware 220, and interface hardware 230.

Processing hardware 210 may include one or more known processing devices, such as a general purpose microprocessor, a microcontroller, etc. that are programmable to execute a set of instructions. Memory hardware 220 may include one or more storage devices configured to store instructions used by processor 210 to perform functions related to disclosed embodiments. For example, memory hardware 220 may be configured with software instructions, such as operating system 240 and application 250 that may perform operations when executed by processing hardware 210. The disclosed embodiments are not limited to separate programs or computers configured to perform dedicated tasks. Memory hardware 220 may also store data 251 that the system may use to perform operations consistent with disclosed embodiments.

Interface hardware 230 may include interfaces to I/O devices, as well as network interfaces. For example, the I/O devices may include output devices such as a display, a speaker, etc., while input devices may include a camera unit, hardware buttons, touch screen, etc. Network interfaces may include wireless connection interface under various protocols (e.g., Wi-Fi, Bluetooth®, cellular connection, etc.), wired connection (e.g., Ethernet), etc. The network interface of interface hardware 230 enables system 200 to interact with other devices (e.g., network connectivity provider 102, camera 112, and mobile device 122, etc.), with the I/O interface of interface hardware 230 enables system 200 to interact with a user. For example, with interface hardware 230, mobile device 122 can receive configuration information for transmission of digital data (e.g., SSID, password, etc.) from a user and provide that configuration information to camera 112. Moreover, with interface hardware 230, camera 112 can also receive an input from a user to scan for another device (e.g., mobile device 122) to establish a Wi-Fi Direct connection, and to use that device to connect with the Internet (e.g., network 150).

System 200 may be configured to execute software instructions of operating system 240 and application 250. Operating system 240 may include, for example, Real Time Operating System (RTOS) and Linux operating system. RTOS may include software modules configured to perform real-time processing of data. For example, RTOS may include software modules configured to control, via interface hardware 230, the camera unit to capture images at a certain frame rate and at a certain resolution, and to generate data of the captured images. The Linux operating system may include software modules configured to control the network interface of interface hardware 230. For example, the Linux operating system may receive, via the network interface, an allocated IP address and the URL of server group 132, and determine the source IP address and target IP address of data packets to be transmitted accordingly. The Linux operating system may also generate data packets to include the source and target IP addresses, and then transmit the data packets to server group 132 via the network interface. The Linux operating system may also enable camera 112 to act as a DCHP server or a DCHP client to acquire an IP address for establishing a network socket with server group 132. Furthermore, the Linux operating system may include functionalities that enable camera 112 to establish a Wi-Fi Direct connection with mobile device 122 and a Wi-Fi AP connection with network connectivity provider 102. The Linux operating system may also enable mobile device 122 to establish a Wi-Fi STA connection with network connectivity provider 102.

Application 250 may include one or more software modules configured to provide various functionalities described in this disclosure. For example, application 250 may include a mobile app which, when executed by processing hardware 210, may cause system 200 to display a graphical user interface for displaying information to a user and prompting the user to input information, such as the aforementioned configuration information (SSID, password, URL of target server, etc.). Application 250 may also receive configuration information through other interfaces (e.g., two-dimensional bar codes from the camera) and determine the SSID, password, and the URL of target server from the received configuration information. Application 250 may also interact with various components of operating system 240 to provide various functionalities, such as establishing Wi-Fi Direct connection between camera 112 and mobile device 122, Wi-Fi STA connection between mobile device 122 and network connectivity provider, Wi-Fi AP connection between camera 112 and network connectivity provider, controlling RTOS of operating system 240 to capture video data at a certain frame rate and resolution based on status of connectivity information, etc.

Figure 3:
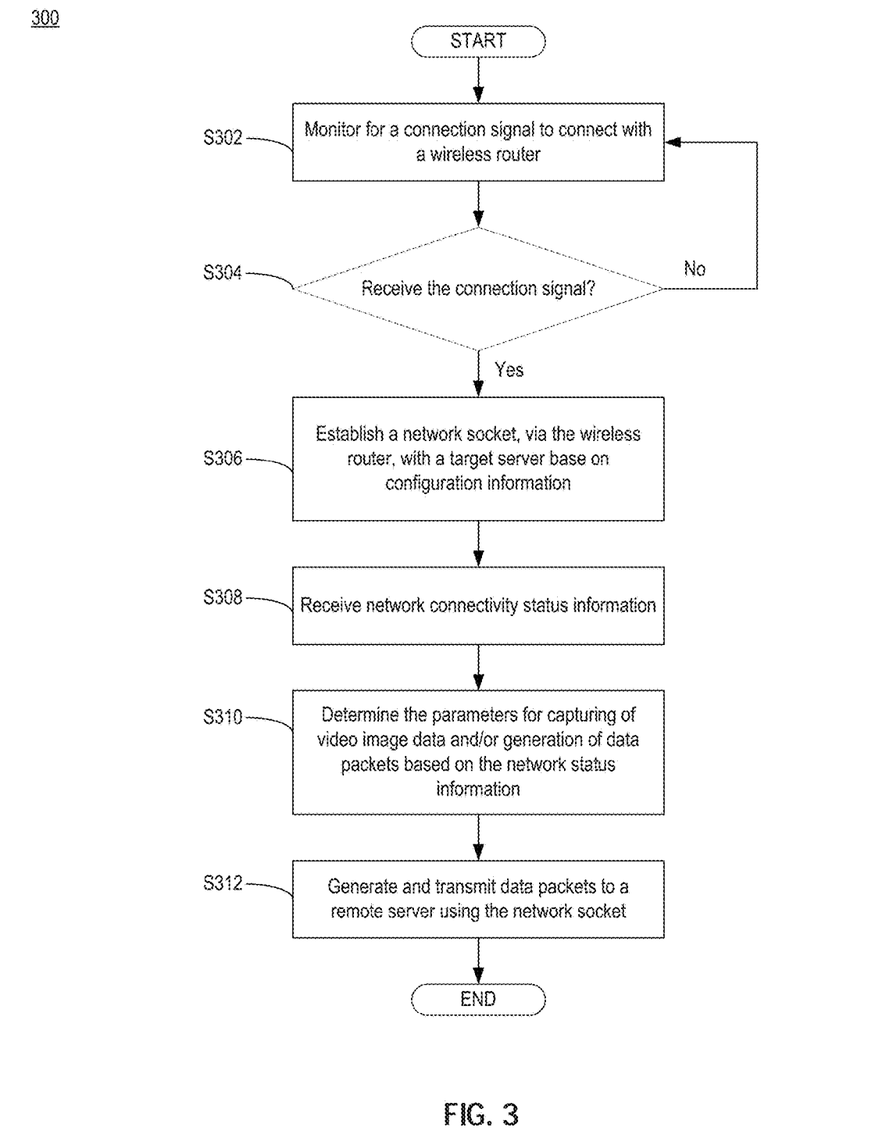
FIG. 3 is a flowchart of an exemplary method consistent with the present disclosure.

FIG. 3 is a flowchart of an exemplary method 300 consistent with the present disclosure. Method 300 may be performed by a system that includes a camera and is capable of establishing a direct connection with a network connectivity provider (e.g., a wireless router) when executing instructions via processing hardware. The system may include, for example, camera 112 of FIG. 1.

After an initial start, the system monitors for a connection signal to connect to a wireless router in step S302. The signal may come in various forms. For example, the signal may be in the form of an input from a user via an input interface to establish a network socket with a target server for transmitting data. As another example, the signal may include configuration information that the system can use for transmission of data. The configuration information can include, for example, SSID associated with the wireless network provided by a wireless router, a password associated with accessing the wireless network via the wireless router, an identifier associated with a target server for receiving the data, etc. The configuration information may come in various forms. For example, the configuration information may be received as a part of wireless data transmitted from a mobile device (e.g., mobile device 122) via a link, or may be received as an image (e.g., two-dimensional bar codes). The system then determines whether the connection signal is received, in step S304. If no connection signal has been received, the system returns back to step S302 to continue the monitoring.

On the other hand, if the system receives the connection signal in step S304, the system may proceed to step S306 to establish a network socket, via the wireless router, with a target server. The network socket can include a TCP socket. To establish the network socket, the system can connect with the wireless router using the SSID and the password included in the configuration information (either received in step S302 or pre-stored). If the system acts as a DHCP client, the system may also transmit a request to the wireless router for an allocation of an IP address. The system may also acquire an IP address and a port number of the target server using the URL information included in the configuration information. The system can then establish a network socket using the allocated IP address (or the system's own MAC address) as a source IP address, and the IP address (and port number) of the target server as a target address, and can use the network socket for transmitting data packets to the target server.

After establishing the network socket in step S306, the system can proceed to step S308 to receive network connectivity status information. The status of connectivity information can include, for example, a latency of transmission of data packets between the system and the target server, a percentage of data packets lost in the transmission, inter packet delay, a jitter value, etc. In some embodiments, the system can receive a message including data about a status of connectivity from an application operating on the target server, and/or from a network service provider.

After receiving the network connectivity status information in step S308, the system can proceed to step S310 to determine parameters for capturing of video image data and generating data packets based on the network status information. For example, the system can determine, based on the status of connectivity information, a threshold for a size of data to be transmitted to the target server within a timing window. If at a given time the system determines that the size of data packets to be transmitted exceeds the threshold, the system may adjust one or more image capture parameters. The image capture parameters can include, for example, image resolution (e.g., 1080 p, 720 p, 480 p, 360 p, 240 p, etc.), frame rate, etc., all of which can affect the rate at which the system generates and transmits the data packets to the target server. Moreover, the system may also adjust one or more parameters for transcoding and compressing the captured data in step S310. For example, if the system determines that the size of data packets to be transmitted exceeds the threshold, the system may determine to transcode the data using a codec that achieves higher rate of compression (e.g., such that the data include less I-frames and more P and B frames, representing the data in interlaced format, etc.), and generate the data packets accordingly.

After determining the parameters for capturing of video image data and/or generating data packets in step S312, the system can then proceed to step S314 to generate and then transmit the data packets to the target server using the network socket established in step S306.

Figure 4:
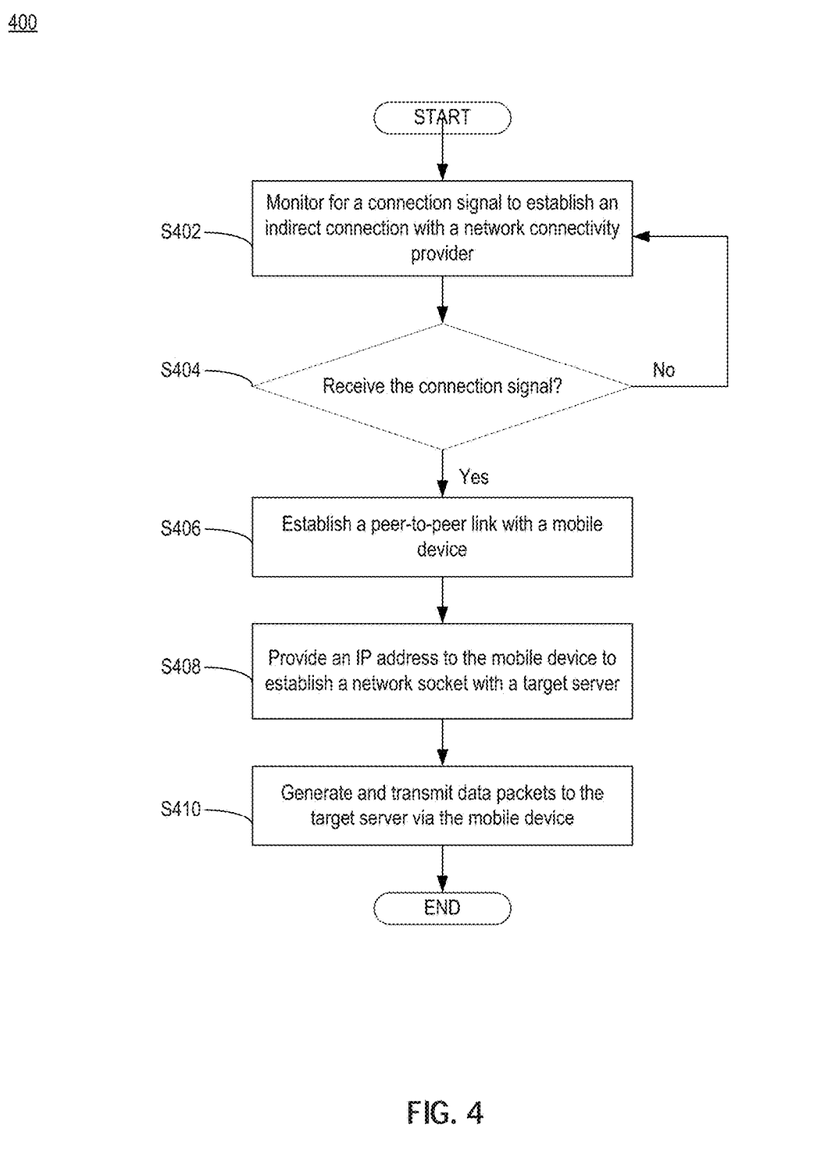
FIG. 4 is a flowchart of an exemplary method for generating and transmitting video data over a network, consistent with disclosed embodiments.

FIG. 4 is a flowchart of an exemplary method 400 consistent with the present disclosure. Method 400 may be performed by a system that includes a camera and is capable of establishing a direct connection with a mobile device (e.g., mobile device 122) when executing instructions via processing hardware. The system may include, for example, camera 112 of FIG. 1.

After an initial start, the system monitors for a connection signal to establish an indirect connection with a network connectivity provider (e.g., network connectivity provider 102 of FIG. 1). The connection signal may come in various forms. For example, the connection signal may be in the form of an input from a user through an input interface. The connection signal may also be in the form of an instruction transmitted from another device. The system then determines whether the connection signal has been received, in step S404. If no connection signal has been received, the system returns back to step S402 to continue the monitoring.

On the other hand, if the system receives the connection signal in step S404 (or if the system determines that it cannot establish a direct connection with the network connectivity provider), the system may proceed to step S406 to establish a peer-to-peer connection with a mobile device (e.g., mobile device 122). The peer-to-peer connection can include, for example, a Wi-Fi Direct connection. To establish the Wi-Fi Direct connection, the system can scan for a mobile device that is capable of forming a Wi-Fi Direct connection. After discovering that device (e.g., mobile device 122), the system may establish a Wi-Fi Direct connection with the discovered device.

After establish the peer-to-peer connection with a mobile device in step S406, the system may proceed to step S408 to provide an IP address to the mobile device, to enable the mobile device to establish a network socket with a target server. In some embodiments, the system may also be configured as a Group Owner (GO) device under the Wi-Fi Direct protocol, and to act as a DHCP server to allocate an IP address. In some embodiments, the system may also provide its own MAC address as the IP address. The mobile device, after receiving the IP address, can establish a connection with a network connectivity provider (which can include a base station or a Wi-Fi router), and provide the IP address to the network connectivity provider to gain access to an external network (e.g., the Internet) via the network connectivity provider. After gaining access to the external network, the mobile device can establish a network socket (e.g., a TCP socket) with the target server via the network connectivity provider.

After the network socket is established in step S408, the system may proceed to step S410 to generate and then transmit data packets to the target server via the mobile device. Although not shown in FIG. 4, the system may also receive an URL of the target server, as well as network connectivity status information, and configure the generation and transmission of data packets similarly as steps S308, S310, and S312 of method 300. The system may also instruct, based on the network connectivity status information, the mobile device to control a size of data packets to be transmitted.

Figure 5:
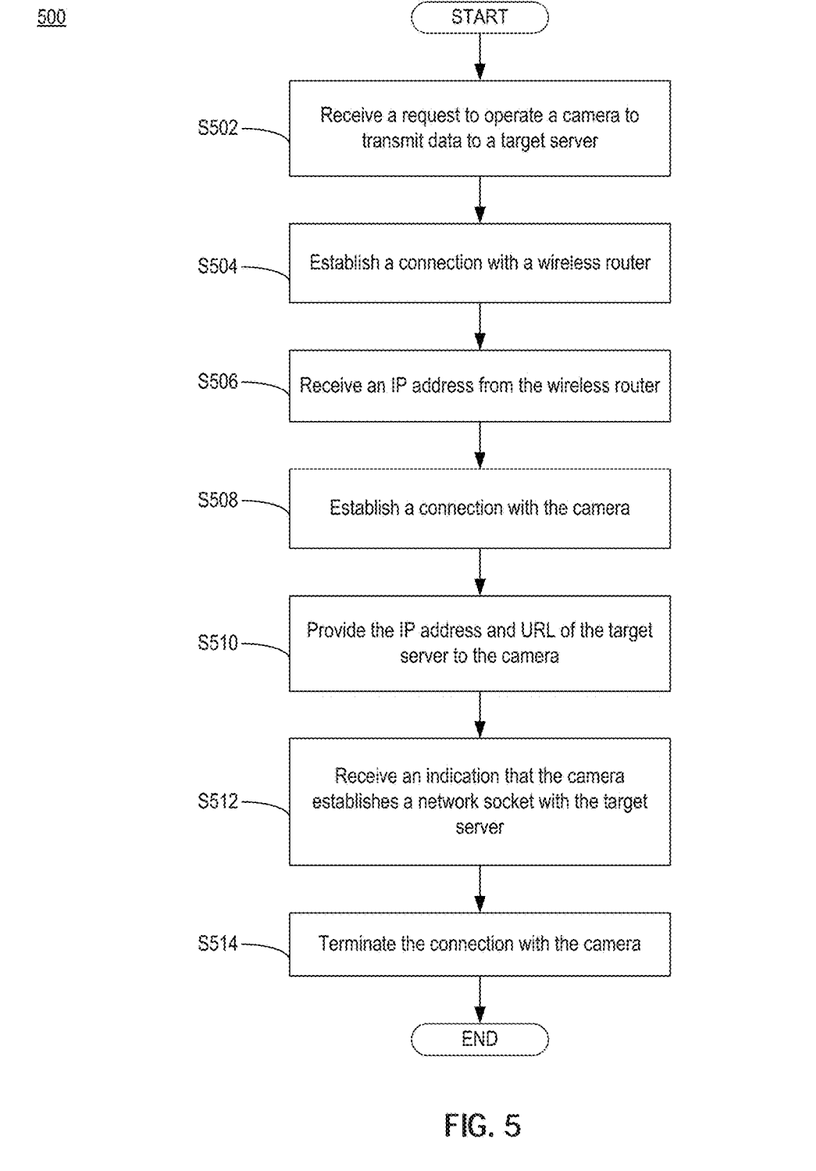
FIG. 5 is a flowchart of an exemplary method for transmitting video data over a network, consistent with disclosed embodiments.

FIG. 5 is a flowchart of an exemplary method 500 consistent with the present disclosure. Method 500 may be performed by a system that is capable of establishing a direct connection with a camera (e.g., camera 112) and with a wireless router when executing instructions via processing hardware. The system may include, for example, mobile device 122 of FIG. 1.

After an initial start, the system receives request to operate a camera to transmit data to a target server, in step S502. The connection signal may be in the form of an input from a user received through an input interface. The input may include, for example, configuration information including an SSID and a password for accessing a wireless router, as well as the URL of the target server.

After receiving the request in step S502, the system proceeds to step S504 to establish a connection with the wireless router using the configuration information. After establishing the connection with the wireless router, the system proceeds to step S506 to receive an IP address from the wireless router. For example, if the wireless router acts a DHCP server, it may allocate an IP address to the system to allow the system to access an external network via the wireless router.

After receiving an IP address from the wireless router, the system proceeds to step S508 to establish a connection with a camera (e.g., camera 112). The connection can be a peer-to-peer connection such as Wi-Fi Direct, Bluetooth®, etc.

The system then proceeds to step S510 to provide the IP address and URL of the target server to the camera, to enable the camera to establish a connection (e.g., a Wi-Fi AP connection) with the wireless router, and to establish a network socket with the target server via the wireless router. After receiving an indication that the camera establishes the network socket with the target server, in step S512, the system can proceed to step S514 to terminate the connection with the camera.

Figure 6:
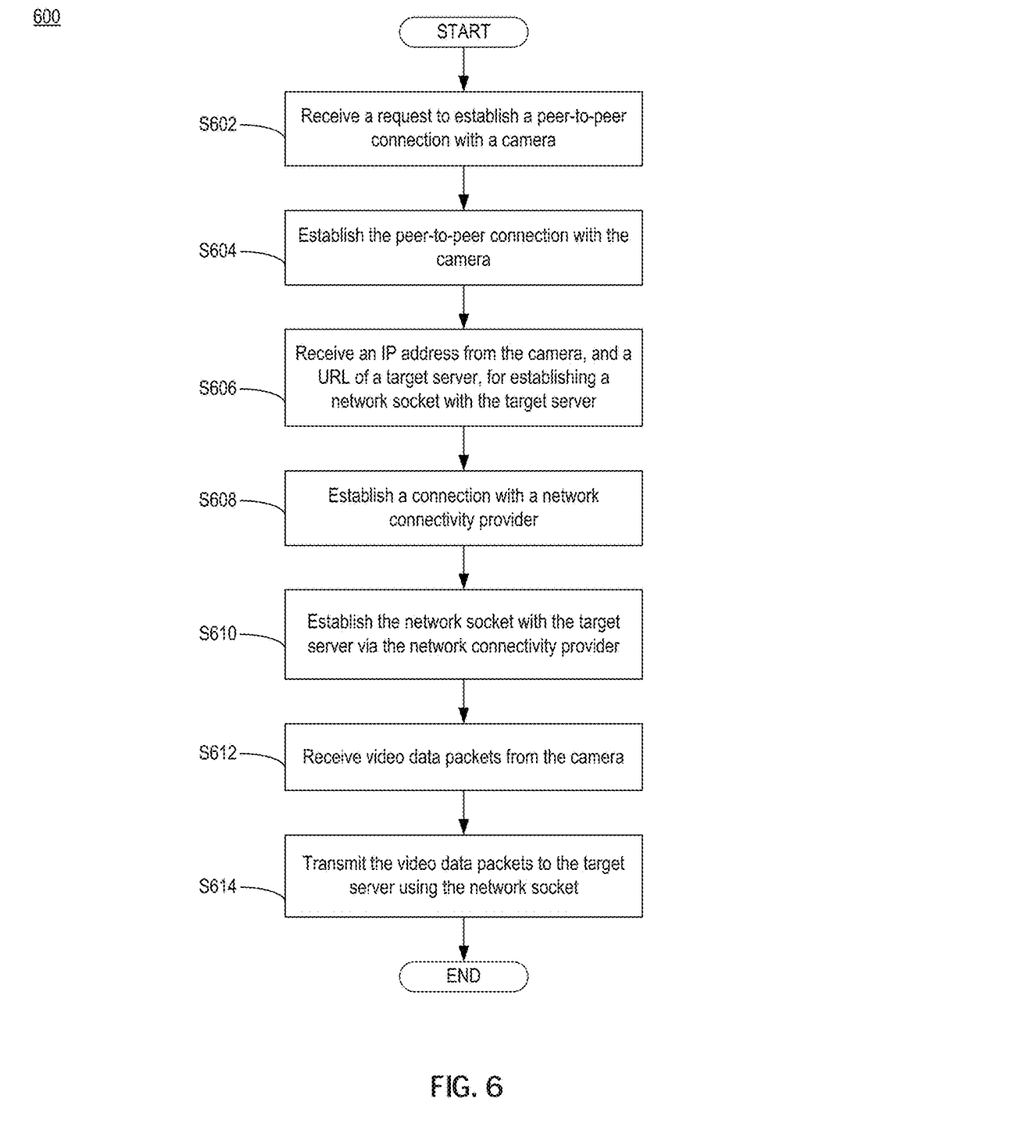
FIG. 6 is a flowchart of an exemplary method for transmitting video data over a network, consistent with disclosed embodiments.

FIG. 6 is a flowchart of an exemplary method 600 consistent with the present disclosure. Method 600 may be performed by a system that is capable of establishing a direct connection with a camera (e.g., camera 112) and with a network connectivity provider (e.g., network connectivity provider 102) executing instructions via processing hardware. The system may include, for example, mobile device 122 of FIG. 1.

After an initial start, the system receives a request to establish a peer-to-peer connection with a camera (e.g., camera 112), in step S602. The request may include, for example, a Probe Request to establish a Wi-Fi Direct connection with the camera. The system can then proceed to step S604 to establish the peer-to-peer connection with the camera.

After establishing the peer-to-peer connection with the camera in step S604, the system may proceed to step S606 to receive an IP address from the camera for establishing a network socket with a target server. In some embodiments, the camera may act as a DHCP server and allocate an IP address. In some embodiments, the camera may provide its own MAC address as the IP address. The system also receives an URL of the target server from, for example, a user input via an input interface, also for establishing the network socket with the target server.

After receiving the IP address and the URL in step S606, the system then proceeds to step S608 to establish a connection with a network connectivity provider. In a case where the network connectivity provider includes a base station of a cellular network, the system can establish a connection with the base station, in step S608. In a case where the network connectivity provider includes a Wi-Fi router, the system can establish a Wi-Fi STA connection with the router.

After establishing a connection with the network connectivity provider in step S608, the system then proceeds to step S610 to establish the network socket with the target server via the network connectivity provider, using the IP address received from the camera and the URL of the target server. The system can then receive data packets from the camera, in step S612, and then transmit the data packets to the target server, in step S614. In some embodiments, the system may also receive instructions from the camera to control a size of data to be transmitted to the target server, where the instructions are generated based on network connectivity status information.

Computer programs created on the basis of the written description and methods of this specification are within the skill of a software developer. The various programs or program modules may be created using a variety of programming techniques. For example, program sections or program modules may be designed in or by means of Java, C, C++, assembly language, or any such programming languages. One or more of such software sections or modules may be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system for transmitting video data over a network, the system comprising:
   a camera configured to capture video data;
   a memory storing a set of instructions; and
   a hardware processor configured to execute the set of instructions to:
      receive a connection signal to establish a direct connection with a network connectivity provider;
      after receiving the connection signal:
         determine whether to establish a direct connection with the network connectivity provider,
         establish a network socket with a target server via the network connectivity provider,
         receive network connectivity status information from the target server, the network connectivity status information including status information recording a connection between the hardware processor and the target server, and
         determine one or more first parameters associated with capture of video data and one or more second parameters associated with generation of data packets representing the captured video data, wherein at least one of the one or more first parameters and the one or more second parameters are determined based on the network connectivity status information;
      control, based on the one or more first parameters, the camera to capture video data;
      generate, based on the one or more second parameters, data packets representing the captured video data; and
      transmit the data packets to the target server using the network socket.

2. The system of claim 1,
   wherein the connection signal includes at least one of first information and second information,
   wherein the first information includes an input from a user requesting establishment of a network socket with a target server for transmitting data, and
   wherein the second information includes at least one of: a Service Set Identifier ("SSID"), a password associated with a wireless router included in the network connectivity provider, and an identifier associated with the target server.

3. The system of claim 2, wherein at least one of the SSID, the password, and the identifier associated with the target server is received via a wireless connection.

4. The system of claim 2, wherein at least one of the SSID, the password, and the identifier associated with the target server is received via the camera.

5. The system of claim 4, wherein at least one of the SSID, the password, and the identifier is represented in a two-dimensional bar code.

6. The system of claim 2, wherein establishing a network socket comprises:
   connecting with the wireless router using the SSID and the password;
   acquiring a first Internet Protocol ("IP") address associated with the system;
   acquiring a second IP address associated with the target server based on the identifier of the target server; and
   establishing the network socket with the target server based on the first and second IP addresses.

7. The system of claim 6, wherein acquiring the first IP address comprises acquiring the first IP address from the network connectivity provider.

8. The system of claim 6, wherein the first IP address is a media access control ("MAC") MAC address of the system.

9. The system of claim 1, wherein the status information regarding the connection between the hardware processor and the target server includes at least one of a percentage of data packets lost in the transmission, an inter packet delay value, or a jitter value.

10. The system of claim 1,
wherein the one or more first parameters comprise at least one of an image resolution and a frame rate; and
wherein the one or more second parameters comprise at least one of parameters for transcoding the captured video data and parameters for compressing the captured video data.

11. A system for transmitting video data over a network, the system comprising:
a camera configured to capture video data;
a memory storing a set of instructions; and
a hardware processor configured to execute the set of instructions to:
receive a connection signal to establish an indirect connection with a network connectivity provider;
after receiving the connection signal:
determine whether to establish a direct connection with the network connectivity provider,
establish a peer-to-peer connection with a second device, and
provide an IP address to the second device to establish a network socket with a target server; and
after the network socket is established:
receive network connectivity status information from the target server, the network connectivity status information including status information regarding a connection between the hardware processor and the target server,
determine one or more first parameters associated with capture of video data, based on the network connectivity status information,
control, based on the one or more first parameters, the camera to capture video data,
generate data packets representing the captured video data, and
transmit the data packets to the second device to enable the second device to transmit the data packets to the target server.

12. The system of claim 11, wherein the hardware processor is configured to execute the set of instructions to:
determine one or more second parameters associated with generation of data packets representing the captured video data, based on the network connectivity status information;
wherein generating data packets representing the captured video comprises generating, based on the one or more second parameters, data packets representing the captured video data.

13. A method for transmitting video data over a network, the method being performed by a hardware processor, the method comprising:
receiving a connection signal to establish a direct connection with a network connectivity provider;
after receiving the connection signal:
determining whether to establish a direct connection with the network connectivity provider,
establishing a network socket with a target server via the network connectivity provider,
receiving network connectivity status information from the target server, the network connectivity status information including status information regarding a connection between the hardware processor and the target server, and
determining one or more first parameters associated with capture of video data and one or more second parameters associated with generation of data packets representing the captured video data, wherein at least one of the one or more first parameters and the one or more second parameters are determined based on the network connectivity status information;
controlling, based on the one or more first parameters, a camera to capture video data;
generating, based on the one or more second parameters, data packets representing the captured video data; and
transmitting the data packets to the target server using the network socket.

14. The method of claim 13,
wherein the connection signal includes at least one of first information and second information,
wherein the first information includes an input from a user requesting establishment of a network socket with a target server for transmitting data, and
wherein the second information includes at least one of: an SSID, a password associated with a wireless router included in the network connectivity provider, and an identifier associated with the target server.

15. The method of claim 14, wherein at least one of the SSID, the password, and the identifier associated with the target server is received via a wireless connection.

16. The method of claim 14, wherein at least one of the SSID, the password, and the identifier associated with the target server is represented in a two-dimensional bar code received via the camera.

17. The method of claim 14, wherein establishing a network socket comprises:
connecting with the wireless router using the SSID and the password;
acquiring a first IP address associated with the system;
acquiring a second IP address associated with the target server based on the identifier of the target server; and
establishing the network socket with the target server based on the first and second IP addresses.

18. A method for transmitting video data over a network, the method being performed by a hardware processor coupled with a camera, the method comprising:
receiving a connection signal to establish an indirect connection with a network connectivity provider;
after receiving the connection signal:
determining whether to establish a direct connection with the network connectivity provider,
establishing a peer-to-peer connection with a second device, and
providing an IP address to the second device to establish a network socket with a target server; and
after the network socket is established:
receiving network connectivity status information from the target server, the network connectivity status information including status information regarding a connection between the hardware processor and the target server,
determining one or more parameters associated with capture of video data, based on the network connectivity status information, controlling, based on the one or more parameters, a camera to capture video data, generating data packets representing the captured video data, and transmitting the data packets to the second device to enable the second device to transmit the data packets to the target server.

19. A non-transitory computer readable medium that stores a set of instructions that is executable by a hardware processor to cause the hardware processor to perform a method for transmitting video data over a network, the method comprising:

receiving a connection signal to establish a direct connection with a network connectivity provider;

after receiving the connection signal:
determining whether to establish a direct connection with the network connectivity provider,
establishing a network socket with a target server via the network connectivity provider,
receiving network connectivity status information from the target server, the network connectivity status information including status information regarding a connection between the hardware processor and the target server, and
determining one or more first parameters associated with capture of video data and one or more second parameters associated with generation of data packets representing the captured video data, wherein at least one of the one or more first parameters and the one or more second parameters are determined based on the network connectivity status information;

controlling, based on the one or more first parameters, a camera to capture video data;

generating, based on the one or more second parameters, data packets representing the captured video data; and transmitting the data packets to the target server using the network socket.

20. A non-transitory computer readable medium that stores a set of instructions that is executable by a hardware processor to cause the hardware processor to perform a method for transmitting video data over a network, the method comprising:

receiving a connection signal to establish an indirect connection with a network connectivity provider;

after receiving the connection signal:
determining whether to establish a direct connection with the network connectivity provider,
establishing a peer-to-peer connection with a second device, and
providing an IP address to the second device to establish a network socket with a target server; and after the network socket is established:
receiving network connectivity status information from the target server, the network connectivity status information including status information regarding a connection between the hardware processor and the target server,
determining one or more parameters associated with capture of video data, based on the network connectivity status information,
controlling, based on the one or more parameters, a camera to capture video data,
generating data packets representing the captured video data, and
transmitting the data packets to the second device to enable the second device to transmit the data packets to the target server.

\* \* \* \* \*